July 9, 1929.  R. H. GILKERSON  1,720,548
EYESHIELD

Filed Oct. 30, 1926

Witnesses
Milton Lenoir
H. B. Florell

Inventor
Roland H. Gilkerson,
By George Heideman
Attorney

Patented July 9, 1929.

1,720,548

UNITED STATES PATENT OFFICE.

ROLAND H. GILKERSON, OF WATERTOWN, WISCONSIN.

EYESHIELD.

Application filed October 30, 1926. Serial No. 145,145.

My invention relates to an eye shield intended for application to spectacles or eye-glasses to constitute an anti-glare device; the invention having for its object the provision of an economical construction which may be easily applied by the user to his eye-glasses without the necessity for removing the latter.

The invention also has for its object the provision of a construction adaptable to eye-glasses whether of the nose-clip or nose-gripping type or of the spectacle type and a construction which will automatically form holding relation with the eye-glasses; the device or eye shield being adaptable and adjustable to conventional eye-glasses regardless of size or shape.

The objects and advantages of the invention will be readily comprehended from the detailed description of the accompanying drawing, wherein—

In the particular exemplification of the invention, my improved eye shield has been shown applied to a pair of spectacles or eye glasses wherein the lenses 10 are shown provided with a surrounding rim or frame 11, with the frames of the two lenses united by the nose-piece or bridge portion shown at 11ª. It will be understood, however, that the eye-glasses may be of the nose-gripping type instead of the spectacle form shown and that the lenses of the eye-glasses need not be set in and surrounded by the lens holding frame portion 11.

The eye shield is illustrated as being formed of thin sheets of celluloid of size sufficient to cover the lenses of the eye glasses to provide the transparent lens covering portions 12.

The lens covering portions 12, 12, for the sake of cheapness in manufacture, are preferably made of a suitably colored celluloid because of its flexibility and therefore less tendency to breakage. It will be understood, however, that the lens covering portions 12, 12 may be formed of any other suitable plastic transparent material, or where desired may be formed of glass; said lens covering portions being of a suitable color adapted to soften strong light rays and prevent the reflection of light-rays by the eye-glasses.

Figure 1:
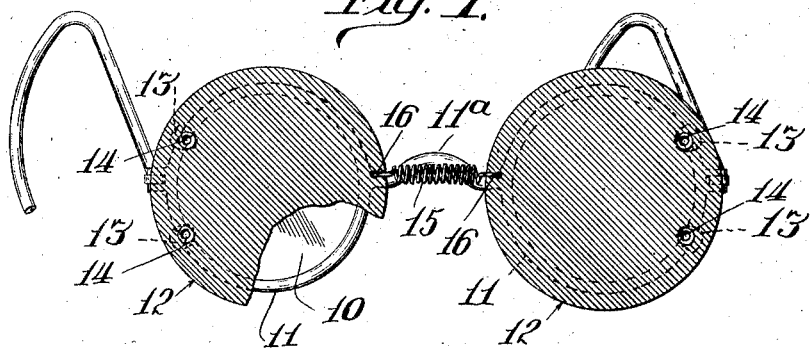
Figure 1 is a front view of my improved device, with part of a lens portion broken away; the figure illustrating my device applied to spectacles, the ear-engaging portions whereof are shown in perspective.

The lens covering portions 12, as shown in the drawing, are substantially circular and of size slightly greater than the lenses of the eye-glasses; with the sides of the portions 12 adapted to cover the outer perimeters of the eye-glasses provided with clip members 13. These clip members are preferably in the form of metallic hooks eye-letted to the lens covering members 12, as shown at 14 in Figure 2. The clips are of similar construction and arranged in pairs adjacent to the outer perimeters of the portions 12 so as to be disposed above and below the horizontal transverse axis of the eye-glasses; the clip members being disposed in a radial manner as shown in Figures 1 and 3.

Figure 2:
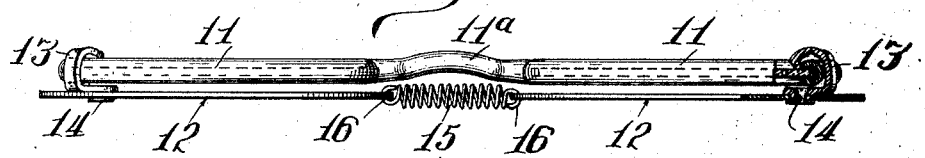
Figure 2 is an edge view of the same with the temple and ear engaging frames omitted.
Figure 3:
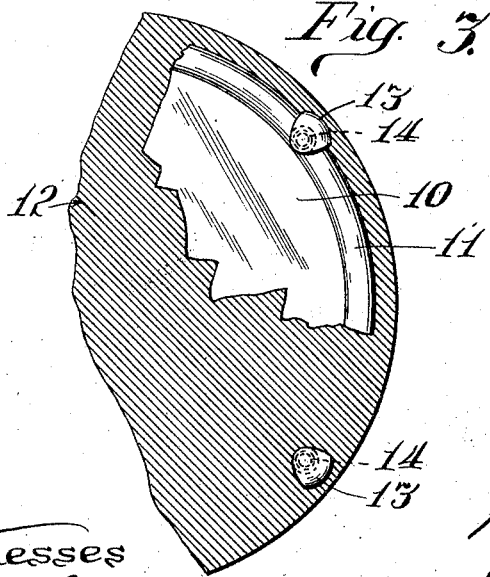
Figure 3 is an enlarged detail view showing a portion of the lens of the spectacle and a portion of the eye shield lens, viewed from the eye-glass side.

The two lens covering members 12 are shown secured together by a small coil spring 15, the ends whereof are bent into hook form as shown at 16, 16, see Figure 2, and made to pass through small perforations in the lens covering members 12. The length and tension of the coil spring 15 and the relative positions of the clips 13 are such that it is necessary to slightly separate the portions 12 by pulling in opposite directions, distending the spring 15, until the clips 13 can be slipped or hooked over the outer edges of the lenses of the eye-glasses. Upon releasing the portions 12, the spring 15 will draw the members 12 toward each other, thereby causing the clips 13 to firmly grip or hold the device on the eye-glasses.

My improved eye-shield is not only applicable to conventional eye-glasses, permitting quick application, but by reason of its construction may be folded into small compact form which enables it to be easily carried by the user.

The invention has been illustrated in its simplest embodiment which has been described in terms employed merely as terms of description and not as terms of limitation, as structural modifications may be made without, however, departing from the spirit of my invention.

What I claim is:

1. An eye shield adapted to be applied to a pair of eye-glasses, comprising a pair of transparent colored members adapted to cover the lenses of the eye-glasses, a pair of metallic hooks eyeleted adjacent to the outer perimeters of each member, the hooks of each pair being arranged in spaced relation above and below the transverse axis of said members, and a coil spring, the ends whereof are in a hook-form and inserted through apertures in the adjacent sides of said members.

2. An eye shield adapted to be applied to a pair of eye glasses and comprising a pair of substantially circular transparent colored members of flexible material, a pair of hook elements arranged adjacent to the outer perimeter of each member at a point above and below the transverse axis of said member, each member adjacent to its inner edge and at the transverse axis having a small aperture, and a spring whose ends are disposed through the apertures of the two members for normally forcing said members toward each other.

ROLAND H. GILKERSON.